United States Patent
Hosotani et al.

(10) Patent No.: US 6,690,586 B2
(45) Date of Patent: Feb. 10, 2004

(54) SWITCHING POWER SOURCE DEVICE

(75) Inventors: Tatsuya Hosotani, Muko (JP); Hiroshi Takemura, Muko (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/152,777

(22) Filed: May 23, 2002

(65) Prior Publication Data

US 2002/0181252 A1 Dec. 5, 2002

(30) Foreign Application Priority Data

May 29, 2001 (JP) ........................................ 2001-160545

(51) Int. Cl.[7] .......................... H02M 3/335; H02M 3/24
(52) U.S. Cl. ............................... 363/19; 363/18; 363/97
(58) Field of Search ............................... 363/18, 19, 20, 363/21.04, 95, 97, 127, 21.15; 323/222, 285, 289

(56) References Cited

U.S. PATENT DOCUMENTS 4,084,219 A * 4/1978 Furukawa et al. ............ 363/97
4,630,186 A * 12/1986 Kudo ........................... 363/19
4,903,182 A * 2/1990 Pilukaitis et al. ............. 363/19

FOREIGN PATENT DOCUMENTS

| JP | 63-100993 | 6/1988 |
| JP | 05-328719 | 12/1993 |
| JP | 11-341802 | 12/1999 |

* cited by examiner

*Primary Examiner*—Rajnikant B. Patel
(74) *Attorney, Agent, or Firm*—Keating & Bennett, LLP

(57) ABSTRACT

A self-excited oscillation type switching power source device is constructed such that when a power source switch is turned on, and the voltage of an input power source increases, the voltage at a point a is increased. When the voltage exceeds a predetermined voltage, a first transistor is turned on, and a second transistor is turned off. Then, a first switching element, when a starting voltage is applied to the control terminal thereof, is turned on, and voltage is developed in a first drive winding. This voltage is fed back to the point a via a feedback circuit. As a result, the transistor is accelerated to reach the on-state. The second transistor is accelerated to reach the off-state. As a result, the first switching element is rapidly turned on, and the oscillation is started.

17 Claims, 8 Drawing Sheets

SWITCHING POWER SOURCE DEVICE

BACKGROUND OF THE INVENTION

1. Field of the Invention

The present invention relates to a self-excited oscillation type switching power source device and, more particularly, to a self-excited oscillation type switching power source device which is provided with a start-stop circuit for controlling the starting and stopping of the device.

2. Description of the Related Art

Self-excited oscillation type switching power source devices of the related art provided with start-stop circuits for controlling the starting and stopping thereof are described, for example, in Japanese Unexamined Utility Model Application Publication No. 63-100993, Japanese Patent Application No. 2000-295203 filed on Sep. 27, 2000, and Japanese Unexamined Patent Application Publication No. 11-341802. In a ringing choke converter (RCC) described in Japanese Unexamined Utility Model Application Publication No. 63-100993, a starting voltage is applied to a switching element using a starting resistor connected between an input power source and a switching element. Also, in a switching power source device for a half-bridge converter described in Japanese Patent Application No. 2000-295203, a starting voltage is applied to a switching element using a starting resistor connected between an input power source and the control terminal of the switching element. Furthermore, in a switching power source device described in Japanese Unexamined Patent Application Publication No. 11-341802 (FIG. 10), a starting voltage is applied to the control terminal of a switching element using a thyristor.

FIG. 11 shows a circuit diagram of the half-bridge converter described in Japanese Patent Application No. 2000-295203. The outline of the configuration of the converter circuit will be described below. A series circuit including a first switching element Q1 and a second switching element Q2 is connected in parallel to an input power source Vin. One end of a series circuit including a capacitor C, an inductor L, and a primary winding T1 of a transformer T is connected to the node between the first and second switching elements Q1 and Q2, and the other end is connected to an input power source Vin. A rectification-smoothing circuit is connected to a secondary winding of the transformer T. The transformer T contains a first drive winding T3 for developing a voltage that is substantially proportional to a voltage of the primary winding T1, and a second drive winding T4. A first control circuit A1 is connected between the first drive winding T3 and the first switching element Q1. A second control circuit A2 is connected between the second drive winding T4 and the second switching element Q2. The first and second control circuits control the turning on and off of the first and second switching elements so that both of the switching elements are alternately turned on and off, with the time period during which both of the switching elements are off being interposed between the alternate on and off. Thereby, the switching power source device is self-excitedly oscillated.

In the above-descried configuration, the capacitor C is connected in series with each other between the primary winding T1 and the input power source Vin. Accordingly, this circuit functions as a half-bridge converter.

As a starting circuit, a resistor voltage-dividing circuit including a resistor R2 connected between the input power source Vin and the control terminal of the first switching element Q1, and a resistor R7 connected between the control terminal and the source terminal is used. That is, when the voltage from the input power source Vin is increased, and the divided voltage obtained by dividing the input power source voltage using the resistors R2 and R7 exceeds the threshold voltage of the first switching element Q1, the first switching element Q1 is turned on. When the first switching element Q1 is turned on, current flows through the primary winding T1, and voltage is developed in the first drive winding T3 and promotes the turn-on of the first switching element Q1. Thereafter, a transistor Tr1 of the first control circuit is turned on, and the first switching element Q1 is turned off, so that voltage is developed in the second drive winding T4, and then, the second switching element Q2 is turned on. In this way, the first switching element Q1 and the second switching element Q2 are controlled so as to be alternately turned on and off. Thus, the self-excited oscillation is carried out.

FIG. 12 is a circuit diagram of the half-bridge converter provided with a circuit similar to the starting circuit using a thyristor described in Japanese Unexamined Patent Application Publication No. 11-341802 (FIG. 10). The basic configuration of this circuit is similar to that of FIG. 11. The first switching element Q1 and the second switching element Q2 are controlled so as to alternately turn on and off. Thus, the self-excited oscillation is carried out. The difference between the configurations of FIGS. 11 and 12 lies in the starting circuits. In the circuit of FIG. 12, a thyristor SR is connected to the control terminal of the first switching element Q1. The outline of the operation at starting will be described below.

When the voltage of the input power source Vin is increased, a capacitor C1 is charged via a resistor R1. When the charge voltage exceeds the Zener voltage of a Zener diode Dz, the thyristor SR electrically conducts. Thereby, the charge stored in the capacitor C1 flows in the gate of the first switching element Q1, so that the first switching element Q1 is turned on. When the first switching element Q1 is turned on, the charge stored in the capacitor C1 is shunt-discharged via a resistor R4 and the first switching element Q1. Moreover, current flows in the primary winding T1 so that voltage is developed in the first drive winding T3, and the turn-on of the first switching element Q1 is promoted. Thereafter, the first switching element Q1 is turned off, caused by the first control circuit, and then, the second switching element Q2 is turned on. Thus, the first and second switching elements Q1 and Q2 are controlled so as to alternately turn on and off. That is, the self-excited oscillation is carried out.

The above-described configurations of the related art have the following problems caused during starting and stopping of the oscillation.

(1) Self-Excited Oscillation Type RCC Using Starting Resistor

For starting, power is supplied to a load by repeating the starting caused by the starting resistor and the turn-off of the switching element. Accordingly, when the starting time-period from the turn-off of the switching element to the re-starting is long, the power supply per unit time is small. Thus, a predetermined output voltage can not be obtained for a heavy load, and the starting becomes deficient.

Moreover, there are problems with the stopping, in that the oscillation continues until the input voltage becomes low, and therefore, the current peak value of the primary winding becomes high, which causes the transformer to be saturated.

(2) Self-Excited Oscillation Type Half-Bridge Converter Using Starting Resistor

When the voltage from the input power source is slowly increased, the first switching element Q1 gradually reaches the on-state from its active region. In this case, the change ratio of the current flowing in the transformer becomes small, so that no voltage is generated in the transformer. In this case, the self-excited oscillation is not performed. Thus, the starting is deficient.

If the input voltage becomes low, and the on-duty of the first switching element Q1 becomes too large in the stopping operation, the first control circuit for controlling the on-off of the first switching element Q1 may malfunction.

(3) Self-Excited Oscillation Type Half-Bridge Converter Using Thyristor or Diac

No problems are caused in the starting characteristic even if the input voltage is slowly increased. The converter requires thyristors and diacs which are special, expensive elements. The thyristors and the diacs used in the circuit of FIG. 12 need to have a high withstand voltage characteristic, since a high voltage is applied to these elements until they start to conduct.

As seen in FIG. 12, the electric charge stored in the capacitor C1 is shunt-discharged every time the first switching element Q1 is turned on. Thus, the converter has a problem in that the switching loss is increased.

If the input voltage is decreased during the stopping operation so that the on-duty of the first switching element Q1 becomes too large, the control circuit for controlling the on-off of the first switching element Q1 may malfunction.

SUMMARY OF THE INVENTION

In order to overcome the problems described above, preferred embodiments of the present invention provide a switching power source device which is provided with a start-stop circuit that both starts and stops oscillation reliably and without errors.

According to a preferred embodiment of the present invention, a self-excited oscillation type switching power source device includes an input power source, a transformer T, a first switching element Q1, a rectification-smoothing circuit, the input power source, the primary winding of the transformer, and the first switching element being connected in series with each other, the transformer T having a first drive winding for developing a voltage which is substantially proportional to a primary winding voltage and causes the first switching element Q1 to turn on, whereby the on-off operation of the first switching element Q1 is controlled, and thereby, the switching power source device is self-excitedly oscillated, and a start-stop circuit including a switch connected between the control terminal and a switching terminal of the first switching element Q1, and a control circuit which detects an input power source voltage across the input power source, compares it to a predetermined voltage, causes the switch to turn off when it detects that the input power source voltage exceeds the predetermined voltage, whereby the first switching element Q1 is turned on, so that the oscillation is started, and causes the switch to turn on when the control circuit detects that the input power source voltage is equal to or less than the predetermined voltage, whereby the first switching element Q1 is turned off, so that the oscillation is stopped.

Accordingly, when the input power source voltage is increased to exceed a threshold, the switch is turned off, and thereby, a starting voltage is steeply applied to the control terminal of the first switching element Q1, due to a starting resistor, so that the first switching element Q1 is turned on. Thereby, even when the input power source voltage is slowly increased, charges in a sufficient quantity to cause the first switching element Q1 to turn on are steeply supplied. Thus, the starting can be securely carried out. For example, even if an AC 100 V commercial power source is used in error for a power source device designed so as to operate with an AC 230 V commercial power source, the power source device can be prevented from operating with the AC 100 V power source device by setting the starting voltage to be higher than AC 100 V. Thus, the device is prevented from malfunctioning with an incorrect power source.

Also, even if the input power source is turned off so that the input power source voltage is decreased, the saturation of the transformer caused by an increase of the primary current, and the malfunction of the device caused by an increase of the on-duty are reliably prevented.

Both of the starting function and the oscillation-stopping function can be performed by the one control circuit. Therefore, it is not necessary to separately provide two circuits. Overall, the number of components can be reduced. Thus, a switching power source device which is highly efficient, has a very small size, and is very lightweight is provided.

Preferably, the device further includes a feedback circuit which is provided between the first drive winding and the control terminal of the start-stop circuit and feeds back an output voltage from the first drive winding to the control terminal to turn off the switch.

The feedback circuit operates so as to positively feed back voltage developed in the first drive winding to the control terminal of the start-stop circuit. Therefore, only the input power source voltage is applied to the control terminal of the start-stop circuit at starting, and after the oscillation is started, the voltage developed in the first drive winding is applied to the control terminal of the start-stop circuit via the feedback circuit, in addition to the input power source voltage. Thereby, the input power source voltage for stopping the oscillation becomes lower than that for starting. Thus, a hysteresis characteristic can be given to these input power source voltages. This hysteresis is effective in preventing the device from malfunctioning caused by chattering of the input voltage. For example, when a commercial power source voltage is rectified and smoothed, and the obtained voltage is used as the input power source voltage, a ripple voltage having a frequency that is substantially equal to two times of the commercial frequency is generated in the input power source voltage. In this case, if there is substantially no difference between the starting and stopping voltages, and the variation of the ripple voltage is large, the device will malfunction when the input power source voltage comes near the ripple voltage. Thus, the oscillation and the stopping are repeated. Thus, according to preferred embodiments of the present invention, malfunctions and problems caused by chattering are prevented, due to the above-described hysteresis characteristic.

Moreover, the above-described hysteresis characteristic causes the oscillation-stopping voltage to be lower than the starting voltage, irrespective of the power supplied to the output. Thus, even if the oscillation is stopped in the interruption of service which instantaneously occurs, and thereafter, the input voltage is increased again, the starting can be carried out. In this case, if the oscillation-stopping voltage is higher than the starting voltage, the starting will be deficient.

Furthermore, referring to the converter having a configuration in which the capacitor is connected in series with the primary winding of a transformer such as a half-bridge converter, when the first switching element Q1 is slowly turned on, starting from the active region, the change ratio of the current flowing in the transformer is small, so that no voltage is developed in the first drive winding. Thus, the self-excited oscillation is not carried out, and the starting becomes deficient. However, since the positive feedback is carried out by the feedback circuit, the first switching element Q1 can be rapidly turned on, and thereby, the deficiency in starting can be eliminated.

In the case of the ringing choke converter in which starting and turning-off of the switching element are repeated to supply power to a load for starting, the converter can be stably started even if the load is heavy, since the turn-on speed at starting is improved so that the starting period is shortened.

Moreover, the on-time period of the first switching element Q1 can be gradually shortened corresponding to the reduction of the input power source voltage at starting by using appropriate elements for the feedback circuit. Thereby, the device can be prevented from malfunctioning caused by increase of the on-duty, and the oscillation can be also maintained when the input voltage becomes low. Moreover, the retention time of the output voltage can be prolonged. Thus, an interruption of service that instantaneously occurs and continues for a long time can be effectively handled.

Preferably, the switch includes a first transistor, the control circuit includes a second transistor connected to the control terminal of the first transistor, the second transistor when the control circuit detects that the input power source voltage exceeds the predetermined voltage, is turned on, and thereby, the first transistor is turned off, whereby the first switching element Q1 is turned on, and the oscillation is started, and when the control circuit detects that the input power source voltage is equal to or less than the predetermined voltage, is turned off, and thereby, the first transistor is turned on, whereby the first switching element Q1 is turned off, and the oscillation is stopped.

Since the switch includes the first transistor, and the control circuit for the switch includes the second transistor, the number of circuit components is reduced. A switching power source device which is inexpensive, is small-sized, and is light in weight is therefore provided.

Preferably, the second transistor compares a voltage divided of the input power source voltage to the threshold voltage between the base and the emitter, and detects whether the input power source voltage exceeds the predetermined voltage or the input power source voltage is equal to or less than the predetermined voltage, based on whether the voltage by resistor-dividing exceeds the threshold voltage or not.

As a way of comparing the input power source voltage to the predetermined voltage, the threshold voltage between the base and the emitter of the second transistor is used. Thus, it is not necessary to use elements such as a comparator, a Zener diode, and so forth. Accordingly, a switching power source device which is inexpensive, is small-sized and is light in weight is realized.

Preferably, the circuit connected to at least one of the base and the emitter of the second transistor has a Zener diode for correcting the temperature characteristic of the voltage between the base and the emitter of the second transistor connected thereto.

In general, the voltage between the base and the emitter of a transistor has a temperature characteristic of about −2.0 mV/° C. Therefore, when the voltage between the base and the emitter of the transistor is used to detect and compare an input power source voltage, the starting voltage changes with temperature. To correct this, the sum of the voltage between the base and the emitter of the transistor and the Zener voltage of a Zener diode is used as a reference voltage. For example, a Zener diode having a temperature characteristic of about +2.0 mV/° C. is used. Thus, the variation of the reference voltage becomes substantially zero. Thereby, the variation of the starting voltage caused by temperature is minimized.

Preferably, the feedback circuit includes a circuit for applying a voltage developed in the first winding to the second transistor, the circuit including at least a resistor and a diode connected in series with each other.

Since the diode is used, no current flows in the feedback circuit at starting. Thus, the starting voltage can be easily determined, not considering current flowing in the feedback circuit. Moreover, the feedback circuit can be simply constructed using a reduced number of parts. Accordingly, a switching power source device which is inexpensive, is small-sized and is light in weight is provided.

Preferably, the feedback circuit includes a circuit for applying a voltage developed in the first winding to the second transistor, the circuit including at least a resistor and a capacitor connected in series with each other.

Since the capacitor is used, DC current at starting does not flow into the feedback circuit. Thus, the starting voltage can be easily set. After the oscillation is started, AC current is caused to flow, and thereby, the feedback can be applied. Similarly to the above-described feedback circuit including the resistor and the diode, this feedback circuit can be simply constructed using a reduced number of parts. Accordingly, a switching power source device which is inexpensive, is small-sized and is light in weight is realized.

Preferably, the feedback circuit includes a circuit for applying a voltage developed in the first winding to the second transistor, the circuit including at least a diode, a resistor, and a Zener diode connected in series with each other, and a capacitor connected in parallel to the diode.

The capacitor connected in parallel to the diode causes the stored charge to be positively fed back at starting, increasing the feedback factor, and can increase the turn-on speed of the first switching element Q1. Moreover, the Zener voltage of the Zener diode connected in series can be optionally set. Thus, the flexibility for setting the oscillation-stopping voltage is greatly improved.

According to another preferred embodiment of the present invention, a self-excited oscillation type switching power source device includes the switching power source device according to preferred embodiments described above in which a second switching element Q2 is connected in series with the first switching element Q1 in such a manner that the series circuit including the first and second switching elements Q1 and Q2 is connected in parallel to the input power source, one end of a series circuit including a capacitor C, an inductor L, and the primary winding of the transformer is connected to the node between the first and second switching elements Q1 and Q2, and the other end of the series circuit is connected to the input power source, a first diode D1 and a first capacitor C1 connected in parallel to the first switching element, a second diode D2 and a second capacitor C2 connected in parallel to the second switching element, a second drive winding which is provided in the transformer T and develops a voltage being substantially proportional to the primary winding voltage to cause the second switching element Q2 to turn on, in addition to the primary drive winding which is provided for the transformer and develops a voltage being substantially proportional to the primary winding voltage to causes the first switching element Q1 to turn on, and a switching control circuit which causes the first and second switching elements to alternately turn on and off with a period of time while both of the switching elements are off being interposed between the alternate on and off, whereby the switching power source device is self-excitedly oscillated.

The switching power source device configured as described above is preferably a converter having a half-bridge configuration. In the converter having the half-bridge configuration, when the input power source voltage is slowly increased, the starting may become deficient. According to this preferred embodiment of the present invention, even if the input power source voltage is slowly increased, the first switching element Q1 is rapidly turned on, so that the change ratio of current flowing in the primary winding of the transformer is increased, and voltage is developed in the primary drive winding. Thus, the self-excited oscillation can be securely started. Moreover, regarding stopping of the device, the input voltage is reduced, and the on-duty of the first switching element Q1 is increased. Thus, before the first control circuit for controlling the on-off of the first switching element Q1 malfunctions, the oscillation is stopped, or the malfunction is prevented by shortening the on-time period. Moreover, the capacitor C1 shown in FIG. 12, which is shunt-discharged every time the switching element is turned on, is not provided. Accordingly, the switching loss can be reduced. A switching power source device which is highly efficient, is small-sized, and is light in weight is realized.

Preferably, the leakage inductor of the transformer is used as the inductor. Since the leakage inductor of the transformer T is used as the inductor L, the number of parts is reduced. Accordingly, a switching power source device which is inexpensive, is small-sized and is light in weight is realized.

Preferably, as the first and second switching elements Q1 and Q2, field-effect transistors are used, and the first and second diodes and the first and second capacitors include the parasitic diodes and the parasitic capacities of the field-effect transistors, respectively.

Since the field-effect transistors are used as the switching elements, the parasitic diodes and the parasitic capacities of the field-effect transistors can be used as the circuit components. Thus, the number of parts is reduced. Accordingly, a switching power source device which is inexpensive, is small-sized and is light in weight is realized.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Figure 1:
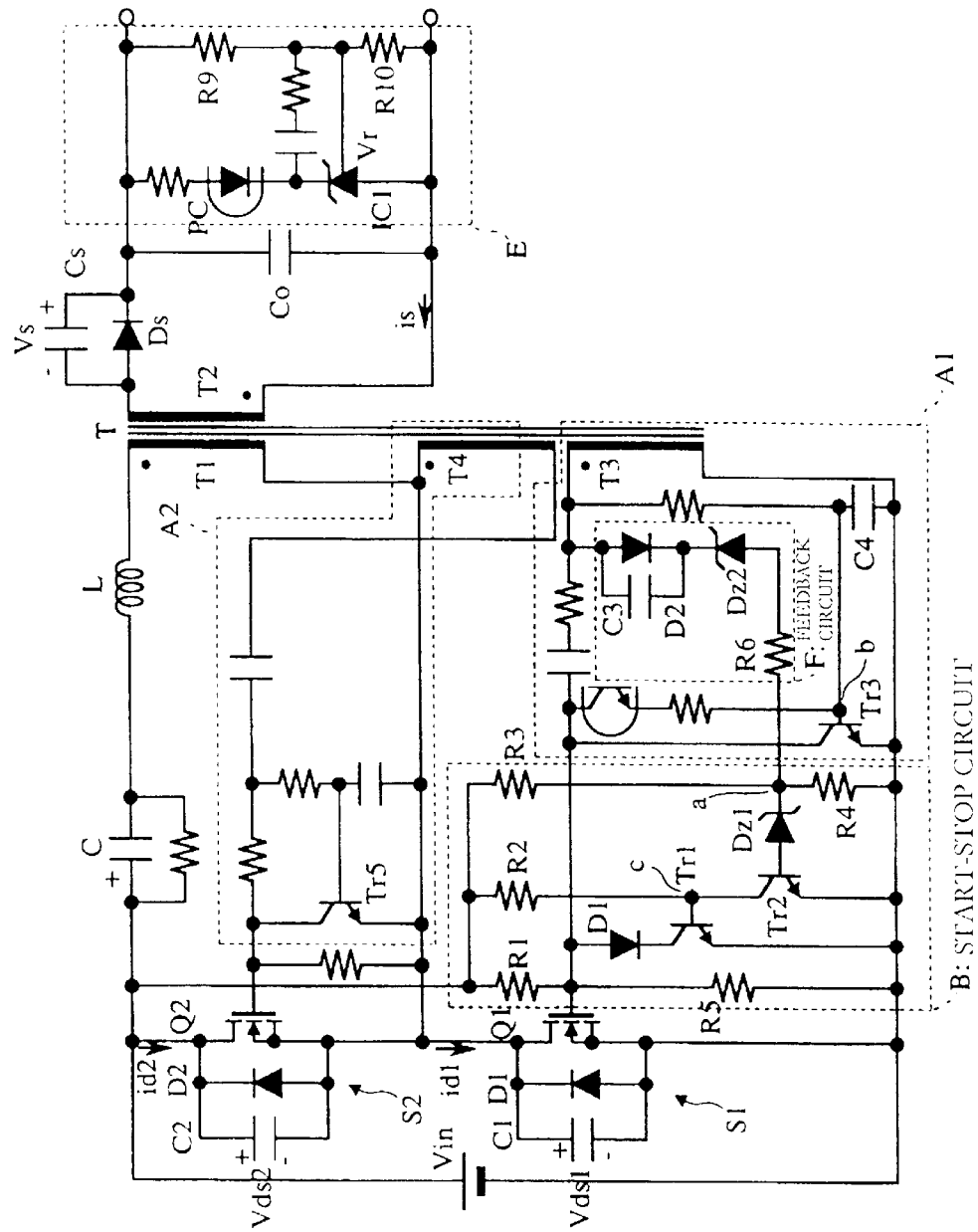
FIG. 1 is a circuit diagram of a self-excited oscillation type half-bridge converter according to a first preferred embodiment of the present invention.

FIG. 1 is a circuit diagram of a switching power source device according to a first preferred embodiment of the present invention.

A first switch circuit S1 preferably includes the first switching element Q1, a first diode D1, and the capacitor C1 which are connected in parallel to each other. A second switch circuit S2 preferably includes the second switching element Q2, a second diode D2, and a second capacitor C2 which are connected in parallel to each other. The first and second switch circuits S1 and S2 are connected in series with each other. This series circuit is connected in parallel to the input power source Vin. Field-effect transistors FET (hereinafter, referred to as FET) are used as the first and second switching elements Q1 and Q2 in the device of this preferred embodiment.

The inductor L and the capacitor C are connected in series with the primary winding T1 of the transformer T. One end of this series circuit is connected to the node between the first and second switch circuits S1 and S2, and the other end thereof is connected to the input power source Vin.

The first drive winding T3 of the transformer T develops a voltage that is substantially proportional to a voltage of the primary winding T1. This drive winding voltage is input to the first control circuit A1. The first control circuit A1 includes a delay circuit which is a series circuit including a capacitor and a resistor connected between the first drive winding T3 and the control terminal (gate) of the first switching element Q1, a transistor Tr3 as a switch for turning off the first switching element Q1, a photocoupler connected to the control terminal (base) of the transistor Tr3 to receive a feedback signal from a detection circuit E, and a time constant circuit for turning on the transistor Tr3. It is to be noted that a feedback circuit F is not included in the first control circuit A1.

Voltage is developed in the first drive winding T3, and later, the first control circuit A1 causes the first switching element Q1 to turn on. Moreover, the transistor Tr3 is turned on for a time period determined by the time constant circuit which includes an impedance and a capacitor C4, after the voltage is developed in the first drive winding T3. Thereby, the first control circuit A1 causes the first switching element Q1 to rapidly turn off.

The transformer T is provided with a second drive winding T4. The voltage of the second drive winding T4 is input to the second control circuit A2. The second control circuit A2 is preferably configured in a similar manner to that of the above-descried first control circuit A1. In the second control circuit A2, a delay circuit is connected in series with the second drive winding T4. The second control circuit A2 includes a transistor Tr5, and a time constant circuit connected to the control terminal (base) of the transistor Tr5.

For the first and second control circuits A1 and A2, the delay time is set such that the first and second switching elements Q1 and Q2 are turned on after the voltage across the capacitor C1 and that across the capacitor C2 are reduced to zero voltage or close thereto, respectively. Thereby, the first and second switching elements Q1 and Q2 carry out the zero-voltage switching function. Accordingly, the turn-on loss is greatly reduced, and generation of switching-noises is minimized. Moreover, the second control circuit A2 controls the second switching element Q2 to turn off when the current flowing there becomes zero or about zero. Thereby, the second switching element Q2 carries out the zero-current turn-off operation. Thus, the switching loss and the switching surge, caused at turn-off, are reduced. As the waveform of current flowing through a rectification element Ds becomes more closely similar to a rectangular shape, the loss in the rectification element is more reduced. The capacitance of the capacitor C and the inductance of the inductor L, and the on-time period of the second switching element Q2 in the switching control circuit are set such that the current has the above-descried waveform.

The detection circuit E preferably includes voltage-dividing resistors R9 and R10, a shunt regulator IC1 having a reference voltage input terminal Vr to which the reference point of the resistors is connected, and a photodiode PC connected in series with the shunt regulator IC1. The shunt regulator IC1 controls the current between the cathode and the anode so that the voltage of the reference voltage input terminal Vr becomes constant. The change of the current is converted to the intensity of a light applied to the photodiode PC. The light enters a phototransistor connected to the first drive winding T3 of the transformer T. In this circuit, the on-timing of the transistor Tr3 is controlled, depending on the intensity of current flowing through the photodiode PC. As a result, the on-time period of the first switching element Q1 is controlled. That is, when the output voltage is increased, and the current flowing through the photodiode PC is about to be increased, the on-time period of the first switching element Q1 is shortened to reduce the output voltage. On the contrary, when the output voltage is decreased, and the current flowing through the photodiode PC tends to be reduced, the on-time period of the first switching element Q1 is increased, and the output voltage tends to be increased. The output voltage is stabilized by this operation.

Hereinafter, the operation of the above-descried switching power source device will be described.

Figure 2:
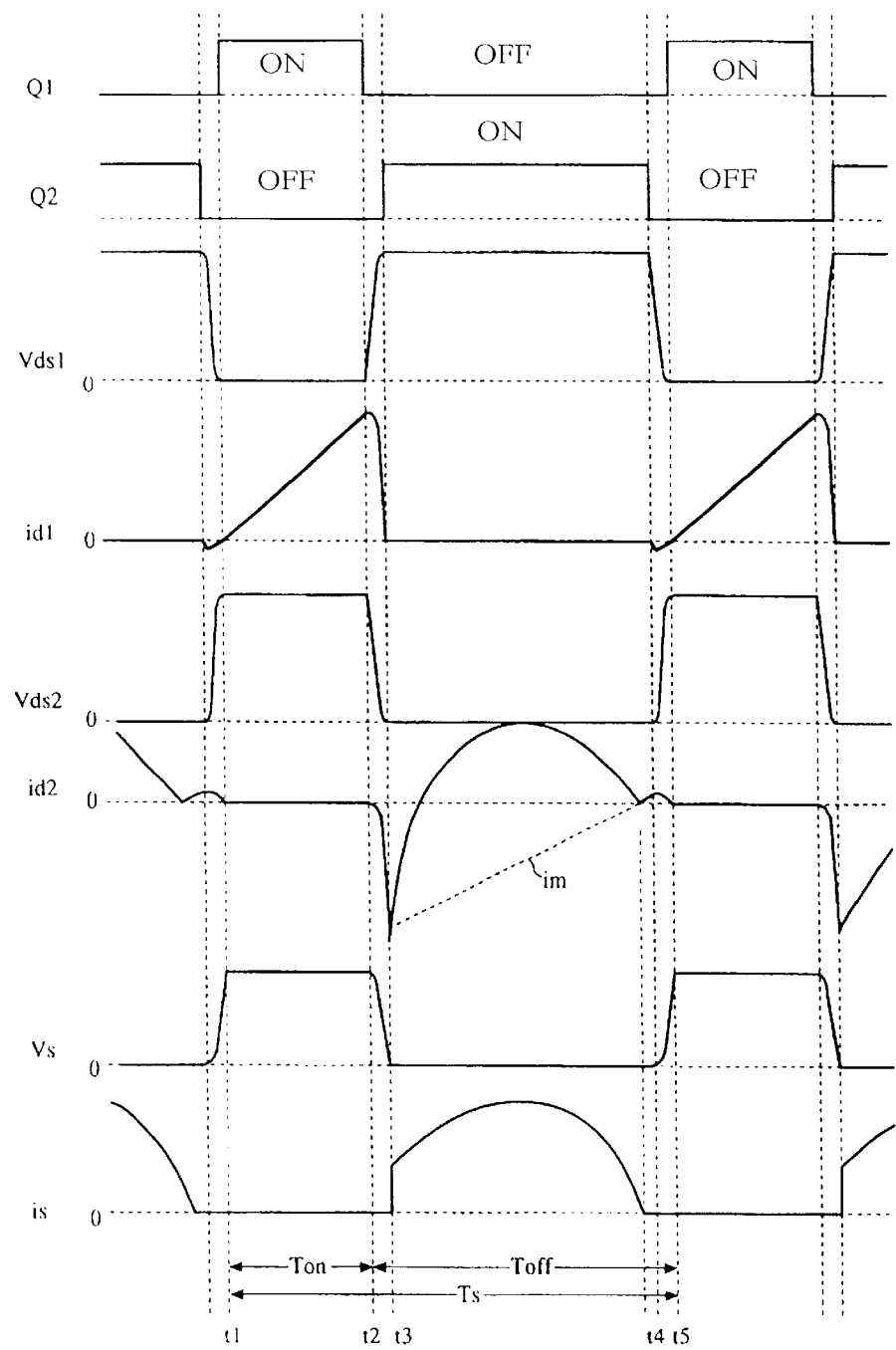
FIG. 2 is an operational waveform chart of the self-excited oscillation type half-bridge converter of FIG. 1.

FIG. 2 illustrates waveform charts of the circuit shown in FIG. 1. Hereinafter, the operation of the circuit will be described with reference to FIGS. 1 and 2.

In FIG. 2, Q1 and Q2 represent signals which show the on-off operations of the first and second switching elements Q1 and Q2, Vds1, Vds2, and Vds represent waveform signals of voltages across capacitors C1, C2, and Cs, respectively, and id1, id2, and represent waveform signals of currents flowing through the switch circuits S1 and S2, and the control element Ds.

The switching operation of this circuit after starting can be divided into four operation-states by time t1 to t5 in one switching period Ts. The starting (at start of the oscillation) and, thereafter, the operations in the respective states will be described below.

At Starting:

When the input power source Vin is applied, the first switching element Q1 is turned on by the start-stop circuit B which will be described in detail later.

The four operation states of the device which start from the on-state of the switching element Q1 and are divided by the time t1 to t5 in one switching period Ts are as follows.

State 1: t1 to t2

The first switching element Q1 is on. The voltage obtained by subtracting the voltage of the input power source Vin from the capacitor voltage is applied to the primary winding T1 of the transformer T. The current in the primary winding is linearly increased, and excitation energy is stored in the transformer T. Moreover, the capacitor C is charged with the current. Thus, static energy is stored in the capacitor C.

At this time, the capacitor C4 is charged via the phototransistor of the first control circuit A1. When the voltage of the transistor Tr3 reaches the threshold voltage (about 0.6 V) of the transistor Tr3, the transistor Tr3 is turned on. The first switching element Q1 is turned off at the time t2. This device gets into the state 2.

State 2: t2 to t3

When the first switching element Q1 is turned off, the primary winding T1 of the transformer T and the inductor L resonate with the capacitors C1 and C2. Thus, the capacitor C1 is charged, and the capacitor C2 is discharged. In the secondary circuit, the secondary winding T2 of the transformer T resonates with the capacitor Cs, so that the capacitor Cs is discharged. The curves corresponding to the leading edge of the voltage VdS1 and the trailing edge of the voltage VdS2 are portions of the sinusoidal waves caused by the resonance of the inductor L and the primary winding T1 with the capacitors C1 and C2, respectively.

When the voltage VDs2 across the capacitor C2 is decreased to zero voltage, the diode D2 conducts. The voltage developed in the second drive winding T4 is applied to the gate terminal of the second switching element Q2 via the capacitor and the resistor of the second control circuit A2 a little later than the time when the first switching element Q1 is turned off. Thus, the second switching element Q2 is turned on. Thus, the zero-voltage switching operation is carried out.

At this time, in the secondary circuit, the voltage Vs applied across the capacitor Cs is decreased to zero voltage, and the rectification element Ds conducts. Thus, the zero-voltage turn-on operation is carried out. The curve corresponding to the leading edge of the voltage Vs is a portion of the sinusoidal wave caused by the resonance of the capacitor Cs with the secondary winding T2.

State 3: t3 to t4

In the state 3, the second diode D2 or the second switching element Q2 conducts, and the inductor L and the capacitor C start to resonate with each other in the primary circuit. In this time-period, the charge stored in the capacitor C is discharged. At this time, in the secondary circuit, the rectification element Ds conducts, so that the excitation energy stored in the transformer T and the static energy stored in the capacitor C are released via the secondary winding T2 and output via the rectification-smoothing circuit. In this case, the current flowing through the rectification element Ds has a similar form with respect to the variable obtained by subtracting the excitation current im linearly decreasing from the resonance current id2 caused by the inductor L and the capacitor C in the primary circuit. Therefore, the current is is rapidly increased, and has a waveform including a sinusoidal curve. The current, after it reaches the peak point where the current change ratio is zero, is decreased toward the zero-current. When the excitation current im of the transformer becomes zero, the rectification element Ds carries out the zero-current turn-off operation, and the current is in the secondary circuit becomes zero.

In the primary circuit, the direction of the excitation current im is reversed, caused by discharge of the capacitor C, and excites the transformer T in a direction that is opposite to that in the state 1. The capacitor connected to the base of the transistor Tr5 of the second control circuit A2 is charged, due to the voltage developed in the second drive winding T4. When the voltage across the capacitor reaches the threshold voltage (about 0.6 V), the transistor Tr5 is turned on. At the time t4, the second switching element Q2 is turned off. Thus, the zero-current turn-off is carried out. When the second switching element Q2 is turned off, the reverse voltage is applied to the rectification diode in the secondary circuit. Then, the capacitor Ds starts to resonate, and the winding voltage of the transformer starts to be reversed.

The timing at which the excitation current im becomes zero is different from that at which the second switching element Q2 is turned off, depending on a load connected to the output. In particular, when the load is light, the second switching element Q2 is turned off after the excitation current im becomes zero, so that the reverse voltage is applied to the rectification element Ds. In the case in which the load is heavy, the excitation current im becomes zero after the second switching element Q2 is turned off, and the reverse voltage is applied to the rectification element Ds. That is, whether the load is light or heavy, the reverse voltage is applied to the rectification element Ds at the time t4 when both of the second switching element Q2 and the rectification element Ds are turned off. Thus, the switching operation reaches the state 4.

State 4: t4 to t5

In the state 4, the secondary winding T2 of the transformer T and the capacitor Cs resonates with each other, and the capacitor Cs is charged. In the primary circuit, the primary winding T1 of the transformer T and the inductor L resonate with the capacitors C1 and C2, and the capacitor C1 is discharged while the second capacitor C2 is charged.

When the voltage Vds across the capacitor C1 is decreased to zero, the first diode D1 conducts. A little later, the voltage developed in the first drive winding T3 is applied to the gate of the first switching element Q1 via the resistor and the capacitor of the first control circuit A1. At the time t5, the first switching element Q1 is turned on. Thus, the zero-voltage switching operation is carried out, whereby the state 5 is finished. At this time, in the secondary circuit, the voltage Vs across the capacitor Cs is increased from zero, and is clamped to the voltage which is equal to the sum of the voltages of the secondary winding and the output voltage.

The above-described operation is carried out per one switching period. The same operation is carried out in the next switching period. Thus, this operation is repeated.

According to the above-descried operation, while the first switching element Q1 is on, the excitation energy is stored in the primary winding T1, and the static energy is stored in the capacitor C. When the first switching element Q1 is turned off, the excitation energy and the static energy are released. Therefore, advantageously, the current peak value can be decreased, and the conduction loss is greatly reduced compared to those of a switching power source device of the related art, that is, a device in which only excitation energy is stored during the on-time period of the first switching element Q1, and the excitation energy is released during the off-time period.

Moreover, in the switching power source device shown in FIG. 1, the first and second switching elements Q1 and Q2 are turned at the zero voltage, and the second switching element Q2 is turned off nearly at the zero current as well as in the switching power source device of the related art. Thus, the switching loss and the switching surge can be significantly reduced. The rectification element Ds in the secondary circuit is turned on at the zero-current. As seen in the current waveform of the rectification element Ds, the current rises relatively steeply from zero, reaches the peak point at which the change ratio of the current becomes zero, and thereafter, becomes zero again so that the rectification element Ds is turned off. Thus, the waveform of current flowing through the rectification element is substantially rectangular. Accordingly, the peak current is kept on a low level, and the effective current is reduced, so that the conduction loss is decreased.

The leakage inductor L of the transformer T is incorporated in the circuit operation. No switching surge is generated, which may be caused by the leakage inductor L, and the voltage is clamped. Thus, semiconductor elements having a low withstand voltage characteristic can be used. The steep change of the waveforms of current and voltage in the switching elements is relaxed. Therefore, the switching noise is greatly reduced.

Hereinafter, the start-stop circuit will be described.

Referring to FIG. 1, the start-stop circuit B preferably includes a first transistor Tr1 which is connected between the control terminal (gate) of the first switching element Q1 and the reference voltage terminal (source) of the input power source Vin and functions as a switch, a second transistor TR2 of which the collector is connected to the control terminal (base) of the first transistor Tr1, a Zener diode Dz1 which is connected to the control terminal (base) of the second transistor TR2, and a resistor voltage-dividing circuit including resistors R3 and R4, the cathode of the Zener diode Dz1 being connected to a voltage-dividing point a of the resistor voltage-dividing circuit. The Zener diode Dz1, the resistor voltage-dividing circuit including the resistors R3 and R4, and a resistor R2 constitute a control circuit for the first transistor Tr1 as a switch.

Hereinafter, the operation of the start-stop circuit will be described.

When the input power source Vin is applied, the voltage thereof is increased, and the potential at the point a which is the voltage-dividing point between the resistors 3 and R4 is increased, the second transistor TR2 is turned on in the following condition.

$$Vin \cdot R4/(R3+R4) > (Vbe+Vz) \quad (1)$$

in which Vbe represents the threshold voltage (about 0.6 V) of the second transistor TR2, and Vz represents the Zener voltage of the Zener diode Dz1.

When the second transistor TR2 is turned on, the first transistor Tr1 is turned off. When the first transistor Tr1 is turned off, the following voltage Vgs is applied to the gate of the first switching element Q1 via a starting resistor R1.

$$Vgs=Vin \cdot R5/(R1+R5) \qquad (2)$$

This voltage is preferably higher than the threshold voltage of the first switching element Q1, and thereby, when the formula (1) is valid, the first switching element Q1 is turned on. When the first switching element Q1 is turned on, current flows in the primary winding T1 of the transformer T, so that voltage is developed in the primary winding T1. Thereby, voltage is developed in the first drive winding T3. This voltage is applied to the second transistor Tr2 via a feedback circuit F, and moreover, caused the second transistor Tr2 to turn on. Thereby, the first transistor Tr1 is turned off, whereby the first switching element Q1 is rapidly turned on.

According to the above-described operation, as seen in the formula (1), when it is detected that the potential Va at the point a exceeds a predetermined voltage, the first transistor Tr1 is turned off, and thereby, the voltage is steeply applied to the gate of the first switching element Q1. Accordingly, even if the voltage of the input power source Vin is slowly increased, the starting can be securely achieved.

The operation at oscillation-stopping will be described below.

When the power source switch is turned off, the voltage of the input power source Vin is reduced. When this voltage is reduced and satisfies the following formula (3) of $Vin \cdot R4/(R3+R4)<(Vbe+Vz)$, the oscillation is not immediately stopped. The reason is as follows. Voltage is developed in the first drive winding T3. This voltage is applied to the point a via the feedback circuit F, which causes the potential Va to satisfy Va>(Vbe+Vz). Thus, the second transistor TR2 continues to be on, and the first transistor Tr1 is turned off, so that the oscillation is maintained. Moreover, when the voltage of the input power source Vin is reduced, the voltage developed in the first drive winding T3, which is proportional to the voltage of the input power source Vin, is reduced, so that the on-time period of the second transistor TR2 is shortened, and the first transistor is turned off at earlier timing than the transistor Tr3. As a result, the on-time period of the first switching element Q1 is gradually decreased. When the potential Va satisfies Va<(Vbe+Vz), the second transistor TR2 is turned off, and the first transistor Tr1 is turned on. Thereby, the first switching element Q1 reaches the off-state, and the oscillation is stopped.

As described above, the gate voltage of the first switching element Q1 is prevented from changing in proportion to the change caused when the input power source Vin (when the source is turned on) rises and when the input power source Vin falls, due to the start-stop circuit B. That is, the voltage is steeply applied to the gate of the first switching element Q1, or the gate voltage is steeply reduced to zero, caused by the turn-off or turn-on of the first transistor Tr1. Therefore, the starting and stopping can be reliably achieved compared to the circuit of the related art in which the starting voltage is applied by use of the resistor dividing-voltage circuit. Even if an AC 100V commercial power source is used for a power source device designed so as to operate with an AC 230V commercial power source, the malfunction of the device can be prevented by setting the potential Va at the point a, obtained when the AC 100V power source is applied, so as to be lower than (Vbe+Vz). Moreover, regarding the turning off of the power source, the on-time period is gradually reduced by use of an input voltage that is lower than the starting voltage, so that the oscillation at the predetermined input voltage is stopped. Thereby, the saturation of the transformer T caused by an increase of the primary current peak, and the malfunction caused by increase of the on-duty can be prevented. Moreover, the start-stop circuit B performs both the starting function and the oscillation-stopping function. Thus, the number of parts is reduced compared to that required when the two circuits are separately provided. This contributes to the high efficiency, small-size, and light weight of the switching power source device.

In the preferred embodiment of FIG. 1 according to the present invention, a feedback circuit F is preferably provided so that the starting of the device and prevention of the malfunction thereof at stopping can be more securely carried out.

The feedback circuit F is connected between one terminal of the first drive winding T3 and the voltage-dividing point a. In the feedback circuit F, a resistor R6, a Zener diode Dz2, and a diode D2 are connected in series with each other. Furthermore, a capacitor C3 is connected in parallel to the diode D2.

Hereinafter, the operation of the feedback circuit F will be described in detail.

As described above, when the voltage of the input power source Vin exceeds a predetermined value for starting, the first transistor Tr1 is turned off, and the voltage is applied to the gate of the first switching element Q1 via the starting resistor R1. Thereby, current flows in the primary winding T1, and moreover, voltage is developed in the first drive winding T3. At this time, the voltage is positively fed back to the point a of the start-stop circuit B via the feedback circuit F. Thereby, the second transistor Tr2 is turned on more steeply compared to the case in which no feedback circuit F is provided. Thus, the first transistor Tr1 is turned off more rapidly, and the first switching element Q1 is steeply turned on.

If the feedback circuit F is not provided, and the formula (1) becomes invalid when the voltage of the input power source Vin rises, the second transistor TR2 may be turned on-off corresponding to the change of the input power source Vin. That is, the second transistor TR2 may malfunction, in which the oscillation and the stopping are repeated. According to the present preferred embodiment of the present invention, the feedback circuit F is provided, and the voltage developed in the first drive winding T3 is applied to the point a. Thus, once the oscillation is started, and the voltage is developed in the first drive winding T3, Va>(Vbe+Vz) is valid, even if the formula (1) fails. Accordingly, the second transistor TR2 is turned on, and the first transistor Tr1 is turned off, so that the above-described malfunction is reliably prevented. Moreover, when the input voltage is reduced so that the voltage developed in the first drive winding T3 is sufficiently decreased, the first transistor Tr1 is turned on earlier than that of the transistor Tr3, so that the on-time period of the first switching element Q1 is shortened. At the time when the input voltage is reduced to a predetermined voltage, the first transistor Tr1 is turned on. Thus, the oscillation can be securely stopped. As seen in the above-description, the feedback circuit F provides such a hysteresis characteristic that the starting voltage of the switching power source device is higher than the stopping voltage.

Figure 3:
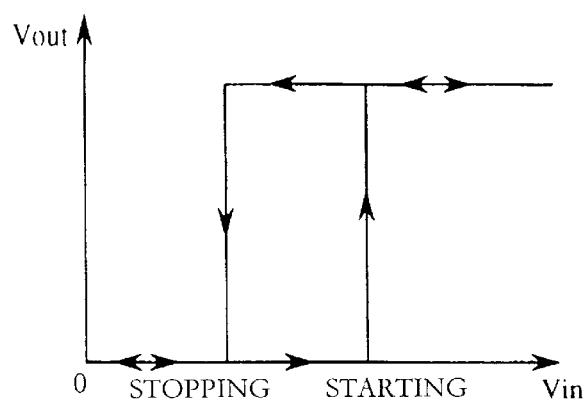
FIG. 3 shows the hysteresis characteristic of the self-excited oscillation type half-bridge converter of FIG. 1.

FIG. 3 schematically shows the hysteresis characteristic. This hysteresis characteristic is more effective in the case in which an input power source is obtained by rectifying and smoothing chattering of the input power source voltage or a commercial power source voltage, and the input power source voltage is considerably changed. More particularly, in the case in which the input power source voltage is changed (vibrated), due to chattering caused by the on-off of the input power source voltages a ripple of the input power source voltage at a commercial frequency, and the like, and the device has a characteristic such that there is substantially no difference between the starting and stopping voltages, the device may malfunction when the input power source voltage repeatedly becomes higher and lower in the vicinity of the starting voltage (or in the vicinity of the stopping voltage). Therefore, the feedback circuit F is provided to give such a hysteresis characteristic as shown in FIG. 3, and thereby, the above-described malfunction can be prevented. If the stopping voltage for stopping the oscillation is higher than the starting voltage, and re-starting is carried out before the input voltage becomes lower than the starting voltage, the re-starting will fail. According to the present preferred embodiment of the present invention, since the stopping voltage is lower than the starting voltage in the hysteresis characteristic, the above-described situation can be securely avoided. Moreover, in such a half-bridge converter as that of this preferred embodiment, the capacitor C is connected in series with the primary winding T1. Thus, there is a danger in that when the first switching element Q1 is slowly turned on, starting from the active region, the starting of the device may fail. However, the device of the present preferred embodiment has a configuration in which the positive feedback is carried out by the feedback circuit F, and the first switching element Q1 is rapidly turned on. Thus, the starting is prevented from failing in any situation.

Figure 4:
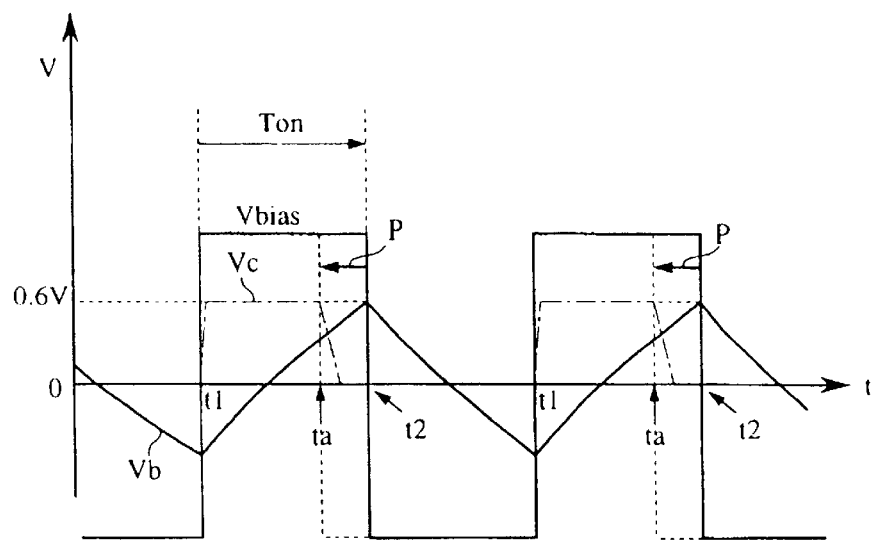
FIG. 4 illustrates the operation of the self-excited oscillation type half-bridge converter of FIG. 1 when the oscillation is stopped.

Moreover, the feedback circuit F also operates so as to suppress the malfunction at oscillation-stopping. FIG. 4 is a waveform diagram obtained when the voltage Vbias developed in the first drive winding T3 is reduced to some degree. Vb and Vc represent the potentials at points b and c, respectively. In this state, when the polarity is changed to be positive, the voltage Vbia is added to the charge stored in the capacitor C3 of the feedback circuit F while the polarity is negative (when the polarity of the voltage developed in the first drive winding T3 is opposite), and the potential is applied to the point a. Thereby, the second transistor TR2 is turned on, and the first transistor Tr1 is turned off. At the time when the charge stored in the capacitor C3 is consumed so that Va<(Vbe+Vz) becomes valid, the second transistor Tr2 is turned off, and the first transistor Tr1 is turned on. The timing at which the first transistor Tr1 is turned on is shown at ta in FIG. 4. On the other hand, when the first transistor Tr1 is not turned on, the transistor Tr3 is turned on at timing t2 for changing the polarity of the Vbias shown in FIG. 4. According to the above-described operation of the feedback circuit F, in the state in which the voltage of the input power source Vin is decreased to some degree, the first transistor Tr1 is more rapidly turned on than the transistor Tr3, so that the on-time period Ton while the first drive winding T3 is positive in polarity is shortened. As a result, with the voltage of the input power source Vin being decreased, the on-time period of the first switching element Q1 is gradually shortened, so that the oscillation is stopped. Thereby, the malfunction, caused when the input power source voltage is decreased so that the on-duty is increased, is prevented, the oscillation can be maintained until a low input power source voltage, the retention time of the output voltage can be prolonged, and moreover, such interruption of service that momentarily occurs and continues for a long time can be effectively handled.

As described above, in the oscillation-stopping operation, the voltage developed in the first drive winding T3 is reduced corresponding to the reduction of the voltage of the input power source Vin. Thereby, the base current of the second transistor Tr2 is decreased, and the off-time period of the first transistor Tr1 is gradually shortened. When the on-time period of the first switching element Q1 is gradually shortened, and the input power source voltage is further reduced, the Zener diode Dz2 of the feedback circuit F is turned off. Thus, the oscillation is stopped.

Figure 5:
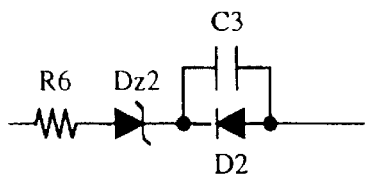
FIG. 5 illustrates a first example of a feedback circuit.
Figure 6:
FIG. 6 illustrates a second example of the feedback circuit.
Figure 7:
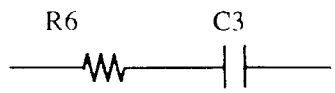
FIG. 7 illustrates a third example of the feedback circuit.

FIG. 5 shows a configuration of the feedback circuit F. FIG. 6 shows another configuration of the feedback circuit F. FIG. 7 shows still another configuration thereof.

In the feedback circuits shown in FIGS. 5 and 7, the capacitor C3 is provided, respectively. Thus, at the oscillation-stopping time, the oscillation can be stopped by gradually reducing the on-time period of the first switching element Q1 as described above. Moreover, the capacitor C3, when it is in the stationary state, functions as a speed-up capacitor for increasing the feedback factor in such a manner that the second transistor TR2 is turned on earlier (in such a manner that the first transistor Tr1 is earlier turn off). At starting, the diode D2 prevents current from flowing into the feedback circuit via the point a, which is set for the resistor voltage-dividing circuit including the resistors R3 and R4. The starting voltage can be easily determined only by the voltage-dividing ratio of the resistors R3 and R4. The Zener diode Dz2 is used to set the oscillation-stopping voltage at a predetermined value. The flexibility for setting the oscillation-stopping voltage is greatly improved due to the Zener voltage of this Zener diode.

Figure 12:
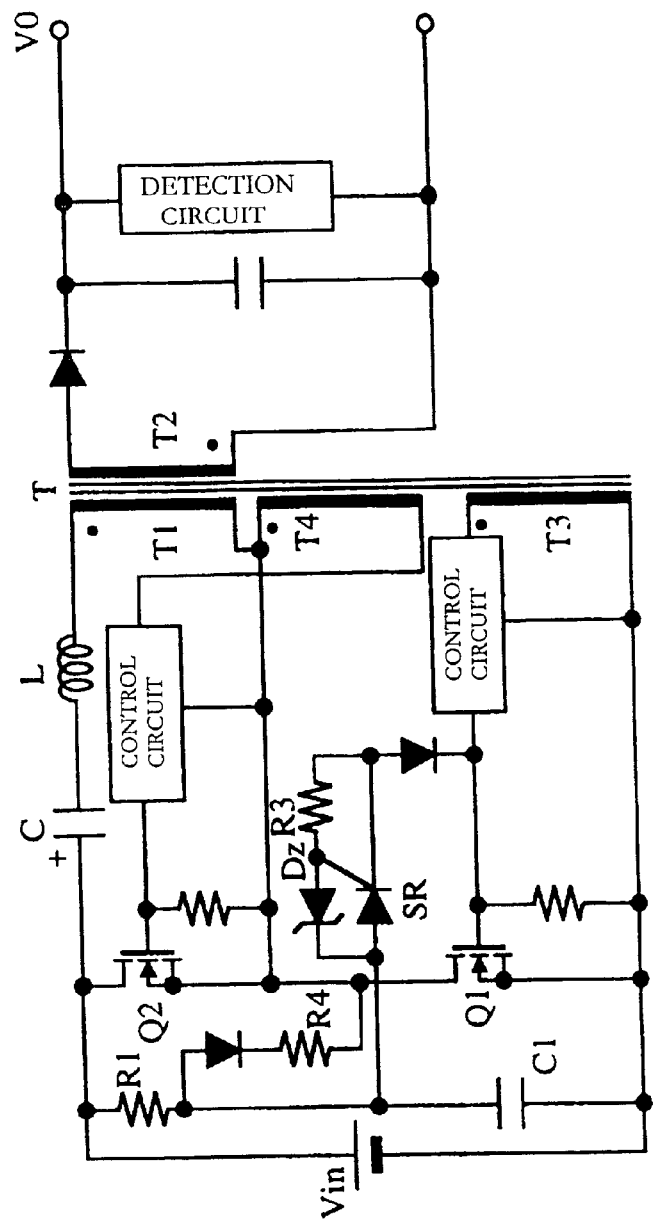
FIG. 12 is a circuit diagram of another example of the switching power source device of the related art.

As described above, according to the half-bridge converter of this preferred embodiment, even if the voltage of the input power source Vin is slowly increased, the self-excited oscillation can be securely started since the first switching element Q1 is rapidly turned on so that the change ratio of the current flowing in the primary winding T1 of the transformer T is increased, and the voltage is developed in the first drive winding T3. At starting, the device can be prevented from malfunctioning by shortening the on-time period of the first switching element Q1 with reduction of the input power source voltage. Moreover, for the start-stop circuit B, it is not necessary to use thyristors and diacs with high withstand voltage properties. For this reason, the cost of the switching power source device is greatly reduced. Moreover, as shown in FIG. 12, the switching loss can be reduced, since the capacitor C to be shunt-discharged every time the switching element is turned on is not provided.

In the self-excited type half-bridge converter of FIG. 1, the inductor L is provided as a separate part. However, this may include the leakage inductor of the transformer T. Thereby, the number of parts can be reduced. Moreover, as the first and second switching elements Q1 and Q2, field-effect transistors may be used. In this case, the parasitic diodes and the parasitic capacities of the field-effect transistors may be used instead of the diodes D1 and D2 and the capacitors C1 and C2. Thereby, the number of parts can be reduced.

Figure 8:
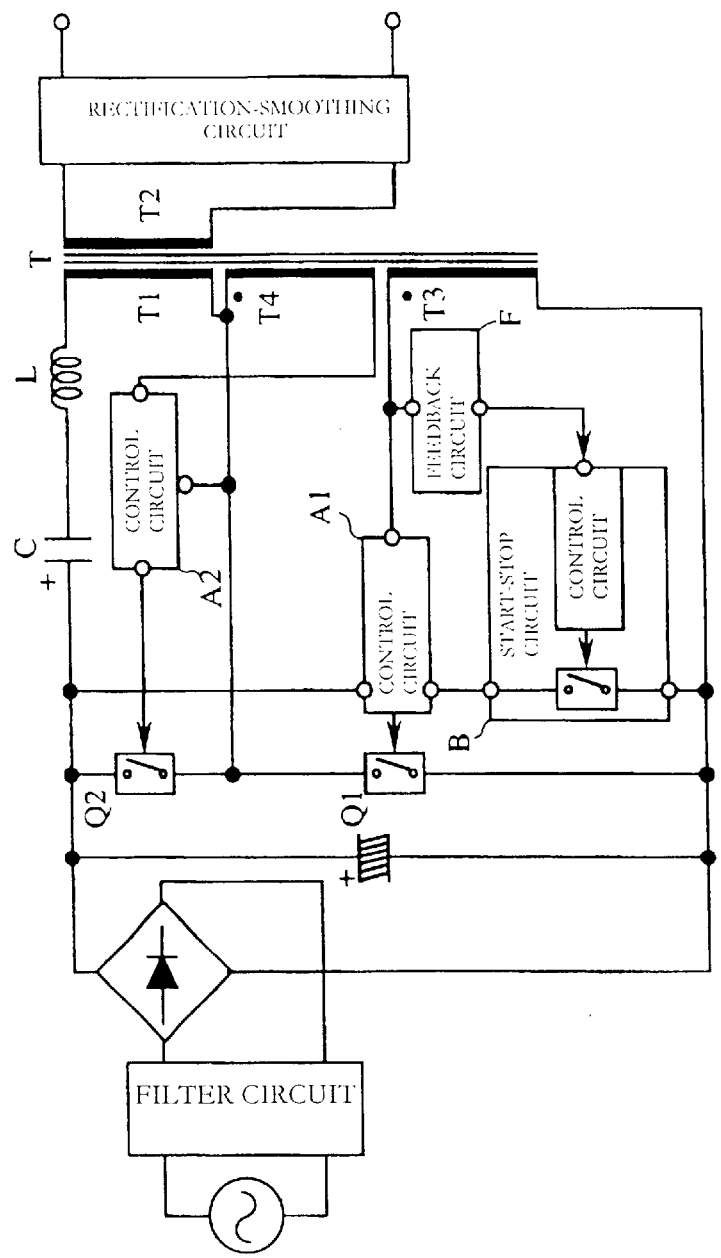
FIG. 8 is a circuit block diagram of the self-excited oscillation type half-bridge converter connected to a rectification-smoothing circuit having a commercial power source.

FIG. 8 is a circuit block diagram showing that a commercial power source is rectified and smoothed to obtain the input power source Vin.

Figure 9:
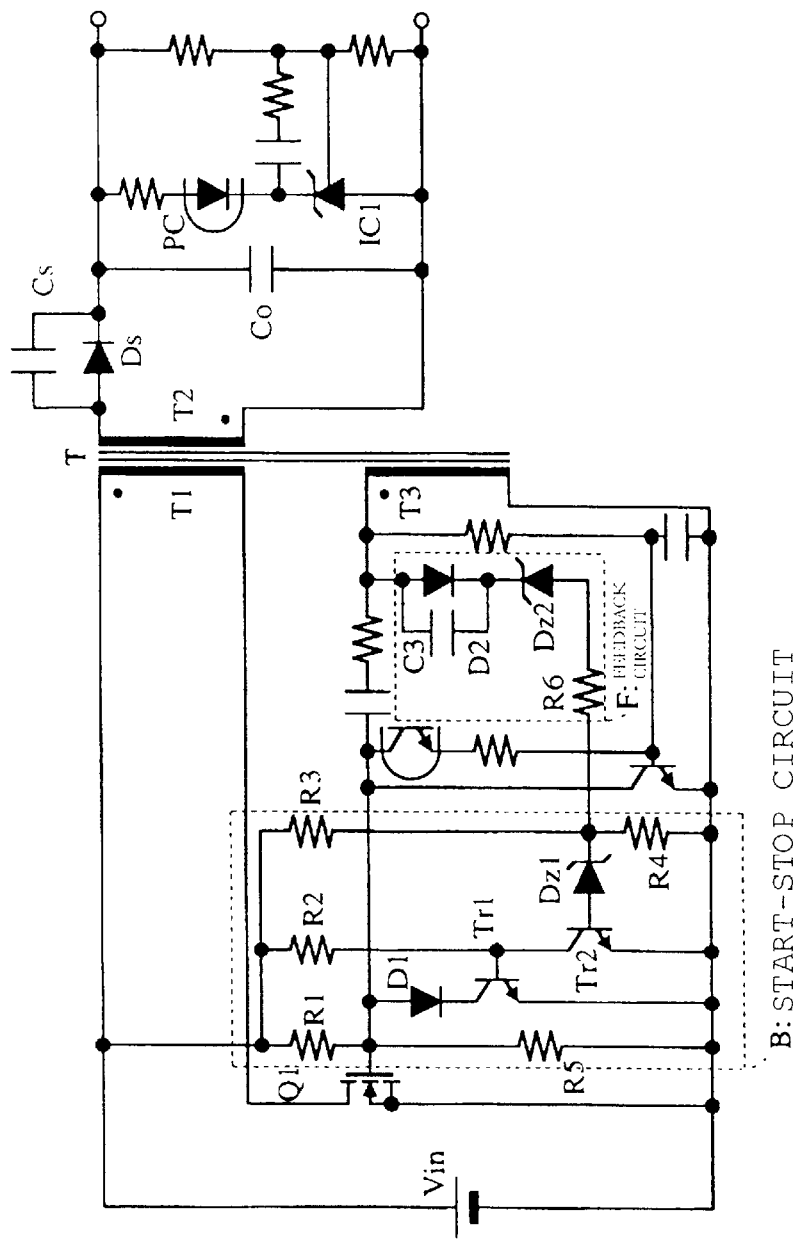
FIG. 9 is a circuit diagram of a ringing choke converter according to another preferred embodiment of the present invention.

FIG. 9 is a circuit diagram of a ringing choke converter according to another preferred embodiment of the present invention. The start-stop circuit B and the feedback circuit F according to the preferred embodiments of the present invention described above can be applied to the ringing choke coil of FIG. 9. The operation of the start-stop circuit B and the feedback circuit F is not different from that of the self-excited type half-bridge converter.

Figure 10:
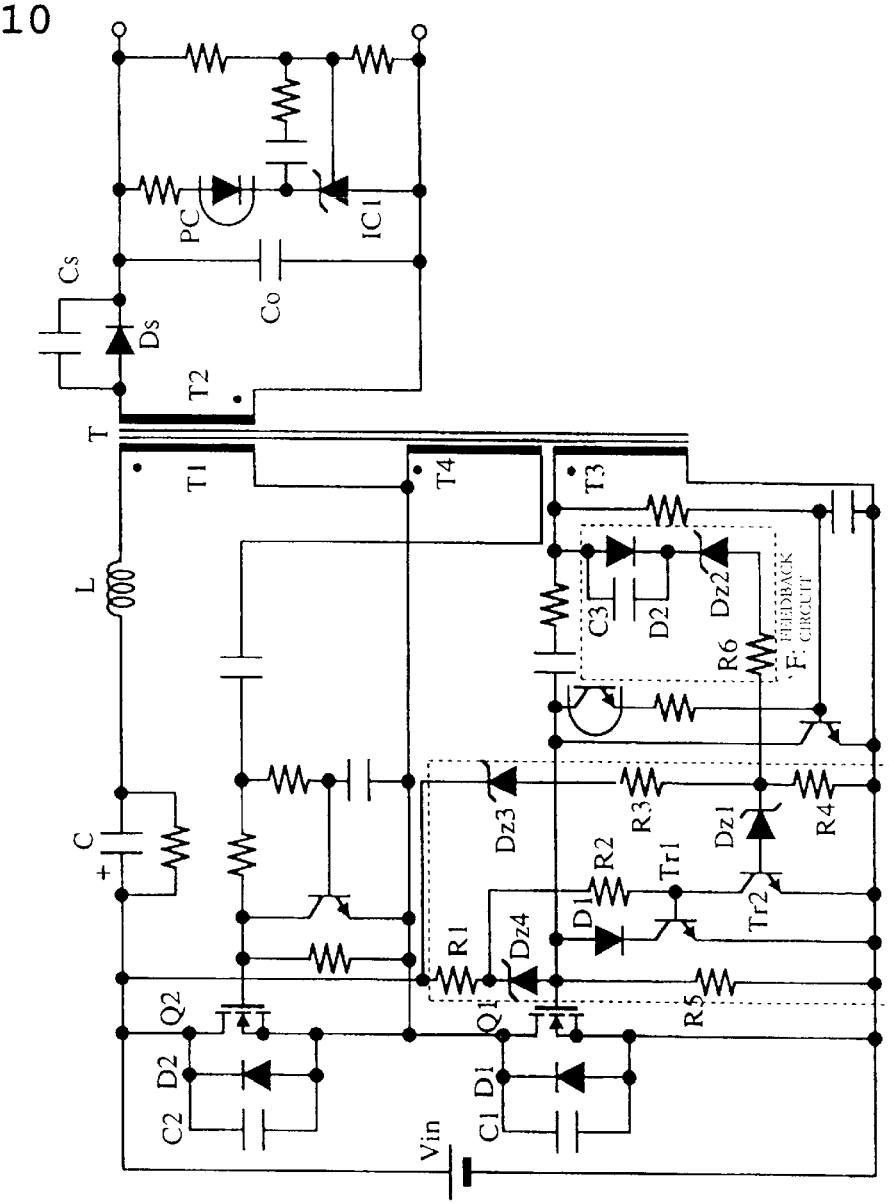
FIG. 10 is a circuit diagram of a self-excited oscillation type half-bridge converter according to still another preferred embodiment of the present invention.
Figure 11:
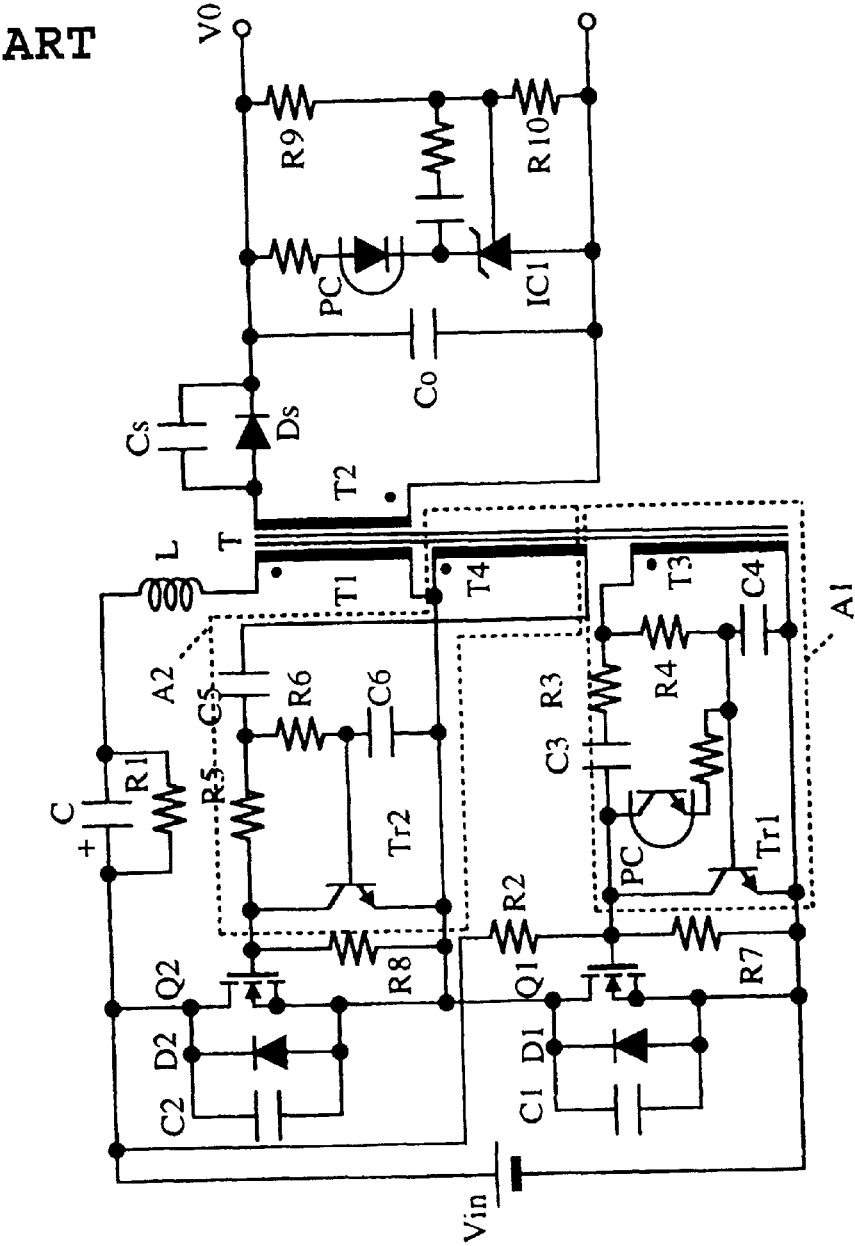
FIG. 11 is a circuit diagram of an example a switching power source device of the related art.

FIG. 10 is a circuit diagram of a self-excited type half-bridge converter according to still another preferred embodiment of the present invention. The difference between the circuit configuration of the converter and that of the device shown in FIG. 1 lies in that a Zener diode Dz4 is preferably connected in series with the resistor R1, and a Zener diode Dz3 is preferably connected in series with the resistor R3. This circuit is not started until the voltage of the input power source Vin causes the Zener diode Dz3 to turn on. Therefore, the converter can be prevented from malfunctioning, caused by an incorrect input power source. Moreover, the resistor R2, which is a path for supplying a base current to the first transistor Tr1, is connected to the cathode of the Zener diode Dz4, and the cathode potential is set to be sufficiently lower than the input voltage, and thereby, the resistance of the resistor R2 can be reduced compared to that thereof connected to the input power source. Thus, the loss is effectively reduced. Moreover, even when the first transistor Tr1 is on, a sufficient base current can be supplied using the resistor R2 as a path, due to the Zener potential of the Zener diode Dz4.

According to various preferred embodiments of the present invention, when the input power source voltage exceeds a predetermined voltage, the first switching element Q1 is steeply turned on so that the oscillation is started. Accordingly, the starting can be prevented from failing, especially when the input power source voltage slowly rises. Moreover, the device can be prevented from malfunctioning, which may be caused by putting an incorrect power source to work. When the input power source is turned off so that the oscillation is stopped, the oscillation is stopped at the time when the voltage of the input power source becomes lower than the predetermined voltage. Thereby, saturation of the transformer caused by an increase of the primary current peak and the malfunction caused by an increase of the on-duty are reliably prevented. Moreover, since the starting function and the oscillation-stopping function can be carried out by one start-stop circuit, the number of parts is effectively reduced compared to the case in which two circuits are separately provided.

Furthermore, since the feedback circuit is preferably provided in addition to the start-stop circuit, the starting can be securely carried out. Moreover, since the hysteresis characteristic is preferably provided for the starting voltage and the stopping voltage, chattering of the input voltage and the malfunction of the device, caused when the input voltage is unstably changed, e.g., caused by the interruption of service which instantaneously occurs, is reliably prevented, and the oscillation is securely stopped. Moreover, the retention time of the output voltage can be prolonged.

According to various preferred embodiments of the present invention, especially in the half-bridge converter in which the capacitor is connected in series with the primary winding of the transformer, problems with related art devices in which the starting is deficient, are eliminated. Moreover, it is unnecessary to use elements having high withstand voltage properties such as thyristors and diacs. Accordingly, a switching power source device which is inexpensive, is small-sized and is light in weight is provided.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A self-excited oscillation type switching power source device, comprising:

an input power source;

a transformer including a primary winding and a secondary winding;

a first switching element including a control terminal and a switching terminal;

a rectification-smoothing circuit connected to the secondary winding;

the input power sources, the primary winding of the transformer, and the first switching element being connected in series with each other;

the transformer having a first drive winding for developing a voltage which is substantially proportional to a primary winding voltage and which causes the first switching element to turn on, whereby the on-off operation of the first switching element is controlled, and thereby, the switching power source device is self-excitedly oscillated; and a start-stop circuit including:
a switch connected between the control terminal and the switching terminal of the first switching element; and
a control circuit which detects a voltage of the input power source across the input power source, compares the voltage to a predetermined voltage, causes the switch to turn off when it detects that the input power source voltage exceeds the predetermined voltage, whereby the first switching element is turned on, so that the oscillation is started, and causes the switch to turn on when the control circuit detects that the input power source voltage is equal to or less than the predetermined voltage, whereby the first switching element is turned off, so that the oscillation is stopped.

2. A self-excited oscillation type switching power source device according to claim 1, further comprising a feedback circuit which is provided between the first drive winding and the control terminal of the start-stop circuit and feeds back an output voltage from the first drive winding to the control terminal to turn off the switch.

3. A self-excited oscillation type switching power source device according to claim 1, wherein the feedback circuit includes a resistor, a Zener diode and a diode connected in series with each other.

4. A self-excited oscillation type switching power source device according to claim 3, wherein the feedback circuit further includes a capacitor connected in parallel to the diode.

5. A self-excited oscillation type switching power source device according to claim 1, wherein the switch includes a first transistor having a control terminal, and the control circuit includes a second transistor connected to the control terminal of the first transistor, the second transistor when the control circuit detects that the input power source voltage exceeds the predetermined voltage, is turned on, and thereby, the first transistor is turned off, whereby the first switching element is turned on, and the oscillation is started, and when the control circuit detects that the input power source voltage is equal to or less than the predetermined voltage, is turned off, and thereby, the first transistor is turned on, whereby the first switching element is turned off, and the oscillation is stopped.

6. A self-excited oscillation type switching power source device according to claim 5, wherein the second transistor includes a base and an emitter and compares a voltage divided of the input power source voltage to the threshold voltage between the base and the emitter of the second transistor, and detects whether the input power source voltage exceeds the predetermined voltage or the input power source voltage is equal to or less than the predetermined voltage, based on whether the voltage by resistor-dividing exceeds the threshold voltage or not.

7. A self-excited oscillation type switching power source device according to claim 6, wherein a circuit connected to at least one of the base and the emitter of the second transistor has a Zener diode for correcting the temperature characteristic of the voltage between the base and the emitter of the second transistor connected thereto.

8. A self-excited oscillation type switching power source device according to claim 5, wherein the feedback circuit comprises a circuit for applying a voltage developed in the primary winding to the second transistor, the circuit including at least a resistor and a diode connected in series with each other.

9. A self-excited oscillation type switching power source device according to claim 5, wherein the feedback circuit comprises a circuit for applying a voltage developed in the primary winding to the second transistor, the circuit including at least a resistor and a capacitor connected in series with each other.

10. A self-excited oscillation type switching power source device according to claim 5, wherein the feedback circuit comprises a circuit for applying a voltage developed in the primary winding to the second transistor, the circuit including at least a diode, a resistor, and a Zener diode connected in series with each other, and a capacitor connected in parallel to the diode.

11. A self-excited oscillation type switching power source device 00according to claim 1, wherein a second switching element is connected in series with the first switching element in such a manner that the series circuit of the first and second switching elements is connected in parallel to the input power source, one end of the series circuit comprising a capacitor, an inductor, and the primary winding of the transformer is connected to a node between the first and second switching elements, and the other end of the series circuit is connected to the input power source;

a first diode and a first capacitor connected in parallel to the first switching element;

a second diode and a second capacitor connected in parallel to the second switching element;

a second drive winding which is provided in the transformer and develops a voltage that is substantially proportional to the primary winding voltage to cause the second switching element to turn on, in addition to the primary drive winding which is provided for the transformer and develops a voltage that is substantially proportional to the primary winding voltage to causes the first switching element to turn on; and a switching control circuit which causes the first and second switching elements to alternately turn on and off, with a period of time in which the first and second switching elements are off being interposed between the alternate on and off, whereby the switching power source device is self-excitedly oscillated.

12. A self-excited oscillation type switching power source device according to claim 11, wherein the inductor includes a leakage inductor of the transformer.

13. A self-excited oscillation type switching power source device according to claim 11, wherein the first and second switching elements includes field-effect transistors, and the first and second diodes and the first and second capacitors comprise the parasitic diodes and the parasitic capacities of the field-effect transistors, respectively.

14. A self-excited oscillation type switching power source device according to claim 1, wherein the self-excited oscillation type switching power source is a half-bridge converter.

15. A self-excited oscillation type switching power source device according to claim 1, wherein the self-excited oscillation type switching power source is a ringing choke converter.

16. A self-excited oscillation type switching power source device according to claim 11, wherein the self-excited oscillation type switching power source is a half-bridge converter.

17. A self-excited oscillation type switching power source device according to claim 11, wherein the self-excited oscillation type switching power source is a ringing choke converter.

* * * * *